US010902471B2

(12) United States Patent
Seko et al.

(10) Patent No.: US 10,902,471 B2
(45) Date of Patent: Jan. 26, 2021

(54) VOICE ASSISTANT GENERATED ADVERTISEMENT FOR A VEHICLE SYSTEM AND METHOD THEREOF

(71) Applicant: Honda Motor Co., Ltd., Tokyo (JP)

(72) Inventors: Shigeyuki Seko, Campbell, CA (US); Shinichi Akama, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 16/104,591

(22) Filed: Aug. 17, 2018

(65) Prior Publication Data

US 2020/0058053 A1 Feb. 20, 2020

(51) Int. Cl.
*G06Q 30/02* (2012.01)
*G06F 16/9535* (2019.01)
*G06F 16/9537* (2019.01)

(52) U.S. Cl.
CPC ..... *G06Q 30/0265* (2013.01); *G06F 16/9535* (2019.01); *G06F 16/9537* (2019.01); *G06Q 30/0255* (2013.01); *G06Q 30/0259* (2013.01)

(58) Field of Classification Search
CPC ...................................................... G06Q 30/02
See application file for complete search history.

(56) References Cited

U.S. PATENT DOCUMENTS

2016/0063561 A1* 3/2016 MacNeille ......... G06Q 30/0269 705/14.62
2020/0005778 A1* 1/2020 Kim ...................... G10L 15/30

FOREIGN PATENT DOCUMENTS

JP 2012-002553 A 1/2012
JP 2017-058315 A 3/2017
WO WO2015/120166 A1 * 8/2015 ............. G06Q 30/00

OTHER PUBLICATIONS

Jie Guo; Bin Song; Ying He; Mehdi Sookhak, A Syrvey on Compressed Sensing in Vehicular InfotainmentSystenns (English), IEEE Communications Surveys & Tutorials (vol. 19, Issue: 4, pp. 2662-2680) Feb. 2, 2018 (Year: 2018).*

* cited by examiner

Primary Examiner — Marilyn G Macasiano
(74) Attorney, Agent, or Firm — American Honda Motor Co., Inc.; Aaron C. Fong

(57) ABSTRACT

The present disclosure relates to a voice assistant that may provide a generalized recommendation based on a natural flow of a conversation and thereafter, generate specific advertisements if there is interest in the generalized recommendation. In an illustrative embodiment, the voice assistant operating on a vehicle computing system may interact with a driver or operator of the vehicle to both respond to and anticipate the user's needs. The voice assistant may identify potential advertisements based on communications with the driver or occupant. The generalized recommendation related to the potential advertisements may be provided to the driver or occupant. If there is interest, the voice assistant may provide an advertisement within the potential advertisements. Real-time information from a location of the advertisement may also be provided that typify the feeling of the location to further draw interest to the advertisement.

14 Claims, 5 Drawing Sheets

VOICE ASSISTANT GENERATED ADVERTISEMENT FOR A VEHICLE SYSTEM AND METHOD THEREOF

BACKGROUND

Voice assistants may provide connectivity within a vehicle that may tap into a user's services to provide valuable aid as they drive. Answers to complex questions may be generated using speech recognition and natural language processing. The voice assistants may retrieve calendars, mapping platforms, favorites, phone lists, and other services to both respond to and anticipate the user's needs. In one vehicle implementation, the voice assistants may be able to suggest a departing time based on traffic conditions and an upcoming meeting. The voice assistants may also control system functions in the vehicle like HVAC controls, door locks, or the like.

The popularity of these voice assistants in the vehicle may provide an opportunity for advertisers. Many advertisers may be interested in maximizing the number of placements for their advertisements using these voice assistants. For example, providing location-based advertising to the user who is looking for a nearby restaurant may quantify as a placement and thus advertisement revenue may be generated. Typical location based requests may be made by asking, "Where is the closest fast food chain?" In turn, the voice assistant may provide names and locations of surrounding fast food chains presented by the advertisers.

Nonetheless, there may be a number of drawbacks in these voice assistants. These advertisements may not take advantage of the natural flow of the conversation. This may leave little for advertisers who wish to provide products and/or services at an indirect advertisement opportunity. Furthermore, providing advertisements alone may not be enough to elicit a response from the user. These mundane advertisements may be missed opportunities.

The present disclosure provides for a voice assistant generated advertisement for a vehicle system and method thereof that addresses the above-identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a vehicle computing system is provided that may include an input device, an output device, at least one processor, and a memory operatively coupled to the processor, the memory storing program instructions that when executed by the processor, causes the processor to perform processes. These processes may include providing and receiving a conversation from the output device and input device, identifying potential advertisements based on the conversation, providing a generalized recommendation related to the potential advertisements through the output device, determining an interest to the generalized recommendation through the input device, providing a specific recommendation associated with at least one advertisement within the potential advertisements if there is interest to the generalized recommendation through the output device, and providing a feeling of the at least one advertisement through the output device.

In accordance with another aspect of the present disclosure, a method of providing advertisements to a vehicle is provided. The method may include receiving a conversation within the vehicle, identifying potential advertisements based on the conversation, providing a generalized recommendation related to the potential advertisements to the vehicle, selecting an advertisement within the potential advertisements if there is interest to the generalized recommendation, providing a specific recommendation associated with the advertisement, retrieving real-time information from a location of the advertisement, and providing the advertisement along with the real-time information from the location of the advertisement to the vehicle.

In accordance with yet another aspect of the present disclosure, a system is provided. The system may include a vehicle having a voice assistant providing a conversation. In addition, the system may include a server receiving the conversation and identifying potential advertisements based on the conversation, wherein the server selects an advertisement of an advertiser server from the potential advertisements and provides the advertisement along with real-time information from the location of the advertisement to the vehicle.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to a vehicle having a voice assistant that may generate advertisements. More particularly, a voice assistant generated advertisement for a vehicle system and method thereof is described that may provide a generalized recommendation based on a natural flow of a conversation and thereafter, generate a specific advertisement if there is interest in the generalized recommendation. In an illustrative embodiment, the voice assistant operating on a vehicle computing system may interact with a driver or operator of the vehicle to both respond to and anticipate the user's needs. The voice assistant may identify potential advertisements based on communications with the driver or occupant. The generalized recommendation related to the potential advertisements may be provided to the driver or occupant. If there is interest, the voice assistant may provide an advertisement within the potential advertisements. Real-time information from a location of the advertisement may also be provided that typify the feeling of the location to further draw interest to the advertisement. This feeling may include sounds, sights, videos or the like at the location.

Numerous other modifications or configurations to the voice assistant generated advertisement for a vehicle system and method thereof will become apparent from the description provided below. Advantageously, specific requests by the driver or occupant are not needed. Rather, the voice assistant may take advantage of the natural flow of the conversation to provide advertisements. This may provide indirect advertisement opportunities for advertisers looking to capitalize on voice assistants. Furthermore, advertisements may be more effective by providing the feeling of the location into the vehicle. Other advantages will become apparent from the description provided below.

Figure 1:
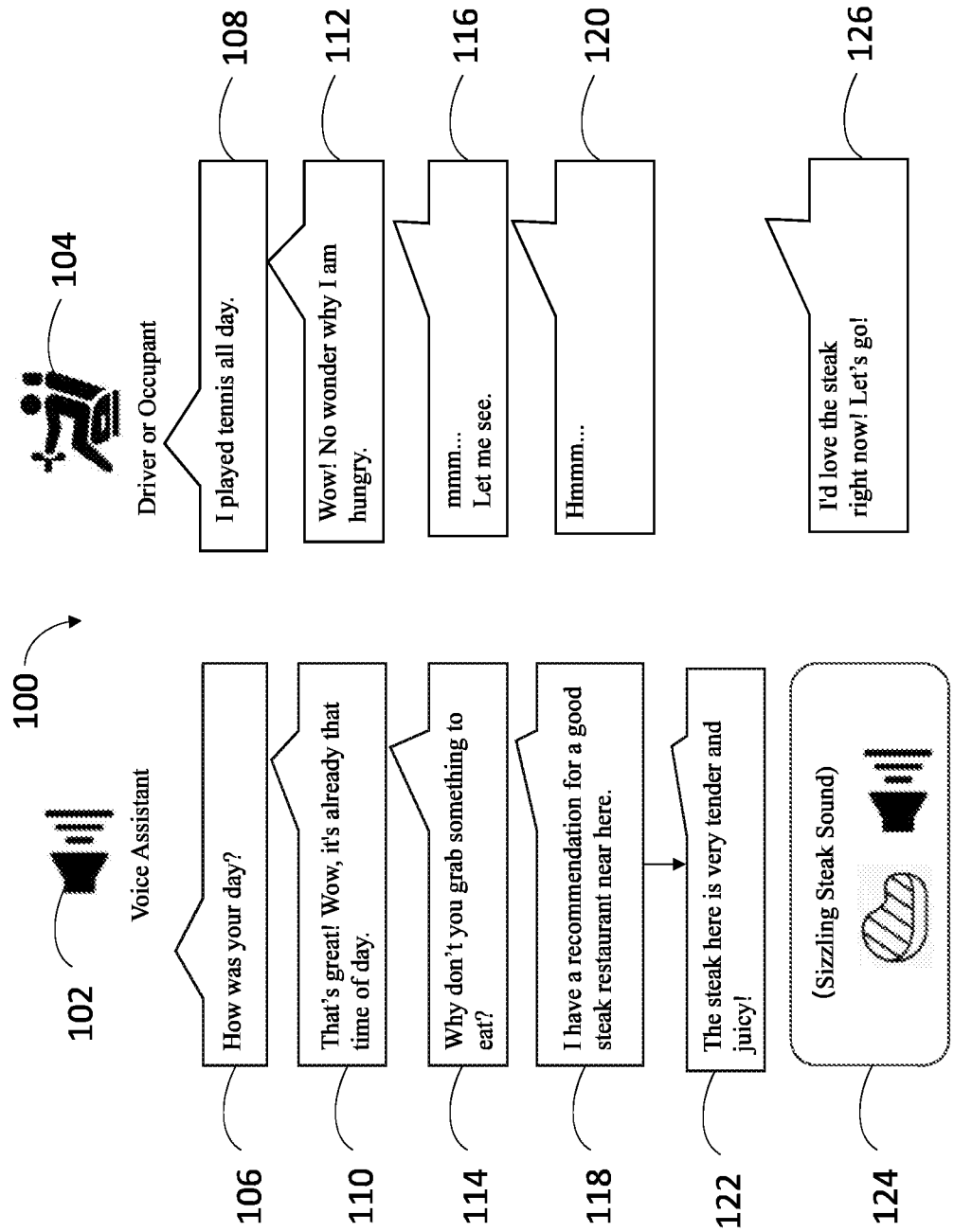
FIG. 1 is a schematic diagram of an illustrative scenario between the driver or occupant and the voice assistant for generating an advertisement in accordance with one aspect of the present disclosure.

FIG. 1 is a schematic diagram of an illustrative scenario 100 between the driver or occupant 104 and the voice assistant 102 for generating an advertisement in accordance with one aspect of the present disclosure. The voice assistant 102 may be integrated into the vehicle for which the driver or occupant 104 is located. The voice assistant 102 may include an input unit as well as an output unit that may be tied into a smartphone, standalone conference phone, mobile device, tablet, desktop, laptop, or may be part of the vehicle itself. Thus, the voice assistant 102, including its functions and/or features, may be implemented wholly on the vehicle, partially thereon, or completely remote from the vehicle.

The voice assistant 102 may include voice recognition software that may enable the driver or occupant 104 to exploit functions, features and/or applications that may otherwise be unfamiliar, unknown, or difficult to use. The voice assistant 102 may work alone or in combination with other input/output interfaces within the vehicle. The shown voice assistant 102 may overcome those missed opportunities described above by providing relevant advertisements in the context of the conversation through generalized recommendations. By suggesting or making these generalized recommendations, specific advertisements may be made if there is interest to those queries.

The voice assistant 102 may be enabled after the vehicle has been started or activated. This may include turning the vehicle on through a key and ignition system. Alternatively, the voice assistant 102 may communicate with the driver or occupant 104 when they are located near or around the vehicle. The voice assistant 102 may also be enabled continuously and may be transferred from one device to another. To achieve this, for example, the voice assistant 102 may operate on the smartphone of the driver or occupant 104 and then transfer control to the voice assistant 102 on the vehicle.

At block 106, and when the voice assistant 102 has been enabled, the voice assistant 102 may provide an introductory query, for example, "How was your day?" This may be communicated through one of the onboard speakers of the vehicle or through the smartphone. This generalized query may be prompted by the voice assistant 102 to get an understanding of how the driver or occupant 104 is feeling. In other words, the voice assistant 102 may be evaluating the context in which an indirect advertisement may exist and gather information through a conversation with the driver or occupant 104.

At block 108, the driver or occupant 104 may respond to the introductory query. For example, the driver or occupant 104 may respond by providing, "I played tennis all day." The voice assistant 102 may receive this information through a microphone, or set of microphones, placed through the vehicle. The voice assistant 102 may process this phrase from their conversation and gather additional information, such that the driver or occupant 104 may be hungry. Calendar information may also be pulled and related to the current time of day. In one example, and if the driver or occupant 104 does not respond, the voice assistant 102 may not continue as the driver or occupant 104 may not wish to speak.

The voice assistant 102, at block 110, may provide a conversational statement such as, "That's great! Wow, it's already that time of day." to try to elicit that the driver or occupant 104 may be hungry. This conversational statement may be pre-programmed or be learned through a number of different types of algorithms. For example, machine learning or artificial intelligence may be used to generate these types of conversational statements. Conversations may be trained within such algorithms that lead to a more natural flow of dialogue between the voice assistant 102 and the driver or occupant 104.

Typically, the voice assistant 102 may determine other information within the conversation before suggesting an advertisement. For example, the voice assistant 102 may identify calories spent playing tennis. Wearable devices on the driver or occupant 104 may also be integrated to the voice assistant 102. The wearables devices may be able to measure actual, or close to, calories spent. The devices may calculate calorie burn information as well as other data such as within personal profiles to determine an advertisement.

At this time in the scenario 100, a set of potential advertisements may be established and identified through the previously described conversation. These advertisements may be related to the context of restaurants or fast food locations, for example. Nearby eateries may be searched for by the voice assistant 102 even though only a generalized understanding of the driver or occupant 104 has been made. Other advertisements, that are not food related, may be made. For example, the voice assistant 102 may understand that the driver or occupant 104 is going home and as such, the voice assistant 102 may gather potential advertisements related to gas since the driver or occupant 104 may be running low. Other potential advertisements may be established in the conversation between the voice assistant 102 and the driver or occupant 104.

Instead of being direct on offering food choices or restaurants, the voice assistant 102 may wait for other indicators that the driver or occupant 104 is hungry. The first statements by the voice assistant 102 may be general understanding queries to determine how the driver or occupant 104 is feeling. These indirect questions may lead to more advertisement opportunities such that the voice assistant 102 may begin to understand how the day of the driver or occupant 104 is going. By probing and questioning, at block 112, the voice assistant may receive a response from the driver or occupant 104 such that the driver or occupant 104 may respond with "Wow! No wonder I'm hungry." Through the previous conversation, this information has been elicited in an indirect or roundabout way.

At block 114, the voice assistant 102 may provide suggestions, which may be related to an advertisement. The suggestion may be indirect or not specific. For example, the suggestion as shown in the scenario 100 may provide "Why don't you grab something to eat?" This suggestion may have been generated by the voice assistant 102 using the previous dialogue. That is, the voice assistant 102 may have realized that the driver or occupant 104 may have been hungry due to the time of day and that the driver or occupant 104 played tennis.

At block 116, the voice assistant 102 may receive a response from the driver or occupant 104 regarding the suggestion. The driver or occupant 104 may respond to the voice assistant 102 with "mmm . . . Let me see." The voice assistant 102, after processing the response, may determine that the driver or occupant 104 may be interested in the previously presented suggestion.

The voice assistant 102 may start to narrow down a specific advertisement within the set of potential advertisements that were identified earlier. This may be narrowed down when the driver or occupant 104 provided that they were hungry through their interest to the previously presented suggestion. Thus, other non-relevant advertisements may be removed, for example and those provided above, gas advertisements may be removed from being presented to the driver or occupant 104.

At block 118, the voice assistant 102 may provide a generalized recommendation to a specific advertisement that was previously selected. For example, the voice assistant 102 may provide to the driver or occupant 104 that "I have a recommendation for a good steak restaurant near here." Noticeably, the voice assistant 102 may not have provided a specific restaurant. The voice assistant 102 may have gathered information about the driver or occupant 104. This information may have been received from the personal profile of the driver or occupant 104. The information may also have been the results of historical trends and preferences. For example, if the driver or occupant 104 has a tendency or habit to go to a steak restaurant with their tennis partner more often than not, the recommendation may be made based on this information.

At block 120, the voice assistant 102 may determine if there is an interest to the generalized recommendation, that is, whether the steak recommendation was well received. The voice assistant 102 may wait a period of time to determine if there is a response to the generalized query. The driver or occupant 104 may provide their response as "Hmmm". This may indicate that the driver or occupant 104 may be interested.

If there is no interest to the generalized recommendation, then the voice assistant 102 may provide another generalized recommendation. For example, if a steak recommendation was not met with interest, then the voice assistant 102 may make a recommendation of a fast food burger restaurant through a generalized recommendation. After a period of time elapses, or there is no interest in the generalized recommendations, the voice assistant 102 may stop providing recommendations.

At block 122, a specific recommendation may be provided. While the name of the restaurant has not been provided, the voice assistant 102 may have selected the specific advertisement and may provide more information about the advertisement. The voice assistant 102 may provide that "The steak here is very tender and juicy!"

At block 124, and to further entice the driver or occupant 104, the feeling or environment of the advertisement may be provided. The feeling or environment of the restaurant may include sights and/or sounds. For example, images and/or videos may be provided to the driver or occupant 104. Along with sound streamed to the driver or occupant 104, the overall aura at the location may be created and provided to the driver or occupant 104. That is, sensory information may be provided such that the driver or occupant 104 may be enticed by the advertisement.

In the scenario 100, a sizzling steak sound may be provided by the voice assistant 102 to the driver or occupant 104. This sound may be pre-established by an advertiser who is providing the specific advertisement. A commercial by the advertiser may also be loaded into a server and provided by the voice assistant 102 at this time. To achieve this, and as will be described below, advertisers may be able to store their specific sound, image, and/or video clips in the server whereby the voice assistant 102 may readily pull this information and provide it to the driver or occupant 104. The ambience of the advertiser's location may be recreated using three-dimensional (3D) surround sound within the vehicle. Potential images on a heads-up display may also be provided.

In one embodiment, the voice assistant 102 may retrieve real-time information from the advertiser's location and provide it to the driver or occupant 104 within the vehicle. To achieve this, cameras, video recorders, and/or the like may be set up at an advertiser's location. This information may be continuously streamed or provided to the server. The voice assistant 102 may then deliver this information to the driver or occupant 104 when the advertisement is served. The cameras, video recorders, and/or the like may be setup at specific spots at the location. These locations may include where interesting sights and/or sounds exist.

While the advertisement shown above was for a steak restaurant, other sights and/or sounds may be provided by the voice assistant 102 when an advertisement is served. For example, sights and/or sounds may be provided from a theme or water park. This may include the splashing or roller coaster sound. By providing this information, this may further entice the driver or occupant 104 to go to the advertiser's location.

At block 126, the voice assistant 102 may wait for a response to determine whether the driver or occupant 104 is interested in the advertisement that was given. Continuing with the steak example, the driver or occupant 104 may have been enticed leading to the driver or occupant 104 saying "I'd love the steak right now! Let's go!" Thus, a number of generalize recommendations were presented to identify the set of potential advertisements and gauge the interest of the driver or occupant 104 allowing for indirect advertisement opportunities. As further interest was determined by the voice assistant 102, the specific advertisement from the set of potential advertisements was proposed. Information was provided from the location, either stored or in real-time, to entice the driver or occupant 104.

Figure 2:
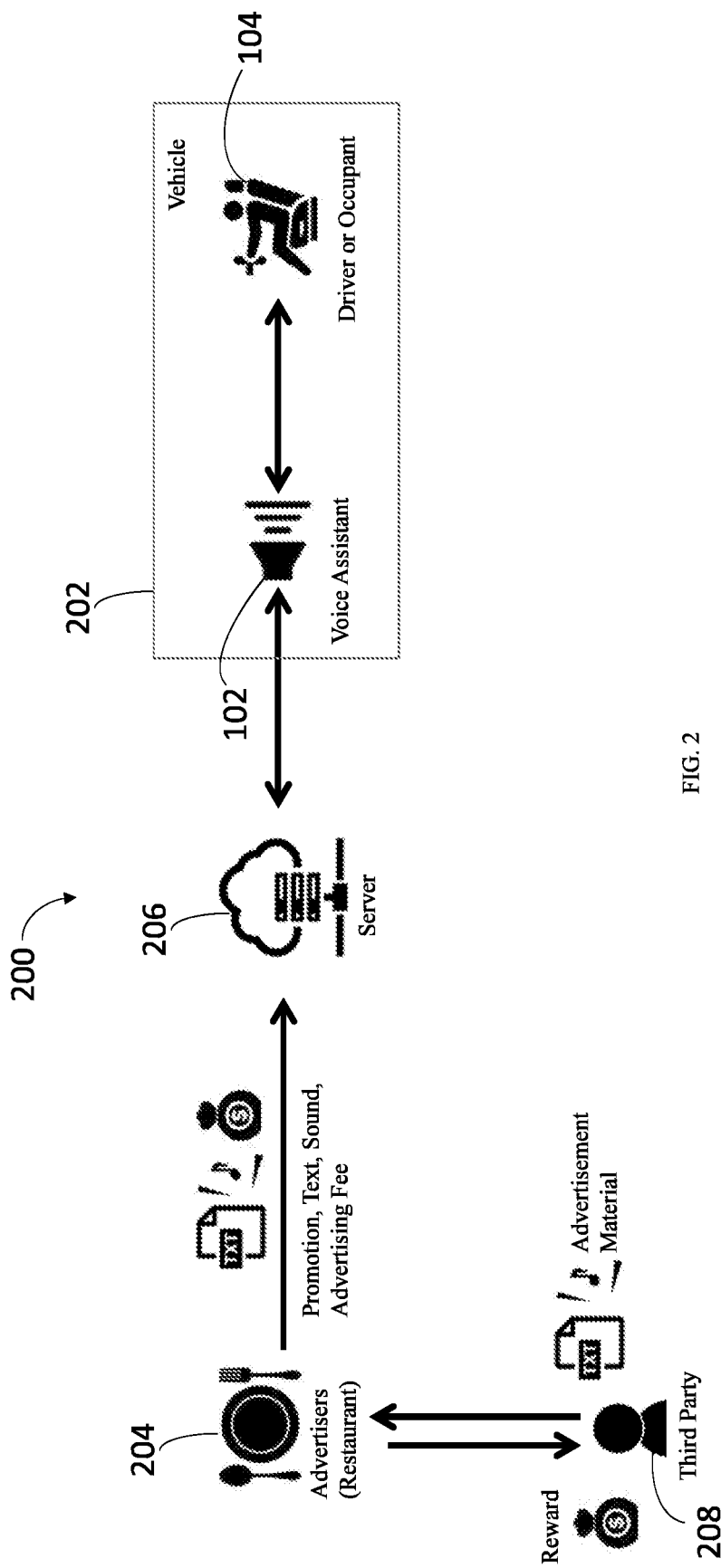
FIG. 2 is a schematic diagram of an illustrative scenario for providing advertisements to the vehicle with the advertisements generated from advertisers in accordance with one aspect of the present disclosure.

FIG. 2 is a schematic diagram of an illustrative scenario 200 for providing advertisements to the vehicle 202 with the advertisements generated from advertisers 204 in accordance with one aspect of the present disclosure. As shown, the voice assistant generated advertisement for a vehicle system and method thereof may operate on a server 206. Functions, features and/or applications of the voice assistant 102 may run atop the server 206, partially or wholly.

Conversations within the vehicle 202 may be provided to the server 206 where it may be processed. The conversation may also be processed locally on the vehicle 202 through a vehicle computing system. In one embodiment, the conversation may be partially processed on the server 206 and the rest on the vehicle 202. The voice recognition software for simpler words or phrases may be processed on the vehicle 202. However, if the wording or phrases become more complex, the conversation may be processed on the server 206.

After processing the conversation, the voice assistant 102 may retrieve an advertisement as described above. The server 206 may establish the set of potential advertisements and specific advertisements. The advertisements may be received by the server 206 from a number of different advertisers 204. As shown, the advertisements may include promotions, text, sound, and advertising fees. Promotions may include coupons or incentives for the driver or occupant 104. These promotions may be for a limited time including when the driver or occupant 104 is nearby the advertiser's location. For example, coupons may not be effective until the user is at the advertiser's location and may not be distributed to others. This information may be determined by a global positioning system (GPS) on the vehicle 202. As such, and in accordance with one embodiment, the coupons may be for only those that are associated with the vehicle.

The text and/or sounds of the advertisements may be stored on the server or may be provided through an advertiser's server. These may be stored or provided in real-time as discussed above. When called, the advertiser's server may provide the advertisements along with the text and/or sounds.

The server 206, as part of the advertisements, may also receive an advertising fee. This fee may be paid for by the advertisers 204 and may vary depending on how they are setup to distribute the advertisements. For example, the advertising fee may directly correspond with how many times the advertisement may have been served to the driver or occupant 104. In one embodiment, the fee may be based on the number of times it was served along with how many times the driver or occupant 104 actually went to the advertiser's location. Other variations of advertising fees exist and are not limited to those shown herein.

The advertiser 204 may be assisted by a third party 208 as shown in the scenario 200 for generating advertisements. The advertisers 204 may work with the third party 208 such that they may generate advertisement materials. They may receive a reward for the generation and production of the advertisement materials. The third party 208 may run atop an advertiser server and provide advertisements to the server 206. In an illustrative example, the sizzling steak sound that was presented to the driver or occupant 104 may be provided from the third party 208. The third party 208 may establish cameras, video recorders, and/or the like at the advertiser's location. When the advertisement is selected by the voice assistant 102, this information may be provided by the third party 208.

In one embodiment, other types of information may be provided within the advertisement materials. For example, the opening and/or closing time of the advertiser's location may be provided. The voice assistant 102 may provide whether the driver or occupant 104 will make it based on the distance to the advertiser's location and the opening and/or closing time of the advertiser. This may take into account how fast or slow the driver or occupant 104 is going. An estimated arrival time may also be provided within the advertisement materials.

Information at the advertiser's location may also be provided. For example, the current conditions at the location may be provided within the advertisement materials. This information may come from the advertiser or third-party service. Waiting time information may also be displayed with the advertisement materials.

In one embodiment, reservations may be made through the voice assistant 102. The server 206 may determine when the driver or occupant 104 arrives at the advertiser's location and establish a window of time when a table should be reserved. The voice assistant 102 may request information such as how many people will be arriving, are there any special requests, or the like. Menu information, such as kids' options, may be provided before arriving to the location.

Figure 3:
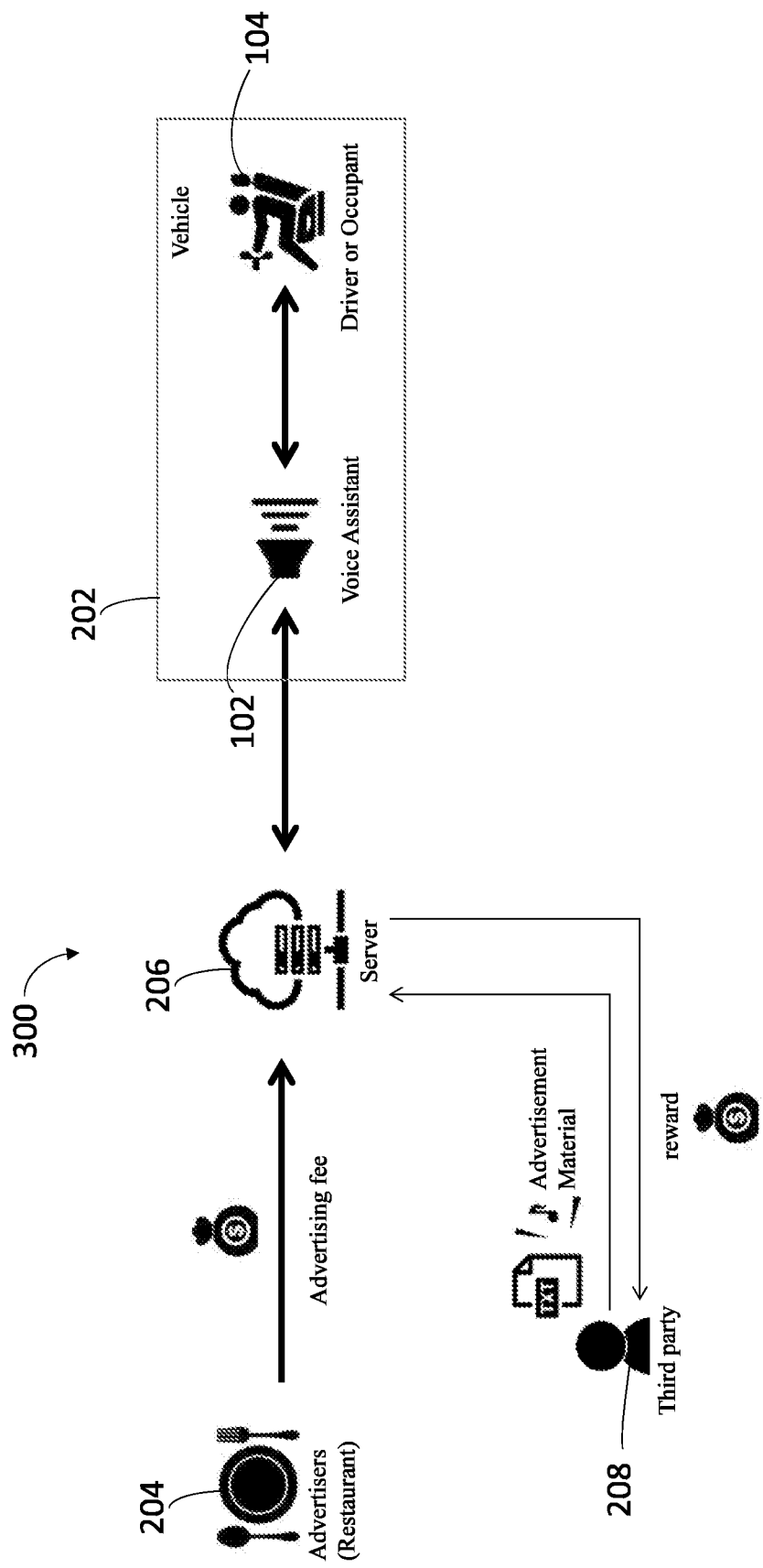
FIG. 3 is a schematic diagram of an illustrative scenario for providing advertisements to a vehicle with the advertisements generated from a third party in accordance with one aspect of the present disclosure.

FIG. 3 is a schematic diagram of an illustrative scenario 300 for providing advertisements to a vehicle 202 with the advertisements generated from a third party 208 in accordance with one aspect of the present disclosure. The third party 208 may run atop an advertiser server. As differentiated from the scenario 200 above, the advertisers 204 may pay the advertising fee and have the third party 208 work on the other mechanics of distributing the advertisement.

To achieve this, the voice assistant 102 may interact with the driver or occupant 104 in the vehicle 202. Through these generalized discussions, a set of potential advertisements may be identified. Specific advertisements may then be ascertained as the conversation further progresses. The advertisers 204 may pay the advertising fee based on the number of visitors by using the system. Alternative payment schemes may also exist. The third party 208 may provide the advertisement materials and get the reward based on the number of visitors or hits.

The server 206 may receive advertisements from the third party 208. The third party 208 may start generating advertisement material once the advertising fee is paid. This material may include video, sounds and/or images from the location of the advertiser 204. This may be in real-time or prerecorded and provided to the server 206 when requested by the voice assistant 102. In turn, the third party 208 may be given a reward which may be a portion of the advertising fee that was received from the advertiser 204.

Figure 4:
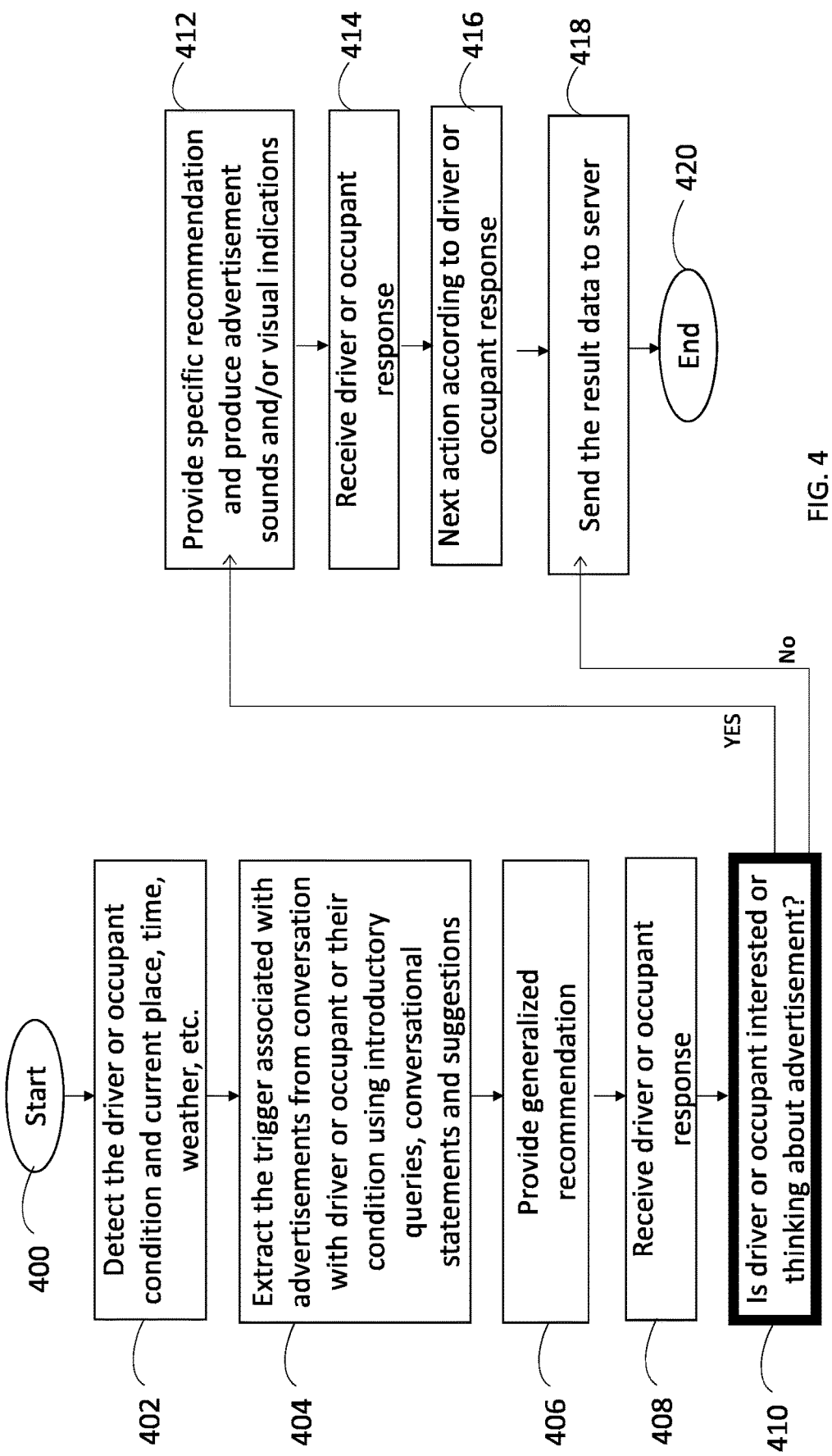
FIG. 4 is a schematic diagram of an illustrative flow chart showing processes for a voice assistant generated advertisement for a vehicle system in accordance with one aspect of the present disclosure.

FIG. 4 is a schematic diagram of an illustrative flow chart showing processes for a voice assistant generated advertisement for a vehicle 202 in accordance with one aspect of the present disclosure. The processes may begin at block 400. At block 402, in one embodiment, the voice assistant 102 may detect the driver or occupant 104 condition and current place, time, weather, etc. The driver or occupant 104 condition may be detected by a camera located in the vehicle 202. The camera may use facial recognition techniques to understand the driver or occupant 104 condition. In one example, the camera may determine that the driver or occupant 104 is tired and generally suggest that they get some coffee. After identifying those set of potential advertisement, a specific advertisement may be provided for which coffee shop the driver or occupant 104 should visit.

Other information may be detected, for example, the vehicle's place or location. A GPS may be implemented within the vehicle 202 or other device. The GPS may be able to locate the vehicle 202 with the driver or occupant 104 in it. By doing this, location based advertisements may be made, that is, advertisers 204 that may be located near the vehicle 302 may be able to provide their advertisements to the driver or occupant 104.

Time information may also be used to identify other potential sets of advertisements, and specific advertisements thereafter. For example, advertisements related to food may not be displayed if lunch time has already passed. The time at which the driver or occupant 104 is in may vary the advertisements. This in combination with a meeting schedule may be used to identify the appropriate set of potential advertisements.

Weather may also be another factor that may be used to determine what type of potential advertisements to provide. Some potential advertisements that may be based on weather may include coffee or hot chocolate advertisements. Skiing or snowboarding advertisements may be dependent on weather information, for example.

At block 404, the voice assistant 102 may be able to extract the trigger associated with advertisements from the conversation with the driver or occupant 104 or their condition. Keywords or triggers may be associated with advertisements that may be pulled from the conversation. The trigger may be pulled from the conversation provided by the voice assistant 102. As shown earlier, this conversation may be produced through introductory queries, conversational statements and suggestions such as "How was your day?", "That's great! Wow, it's already that time of day.", and "Why don't you grab something to eat?" In the scenario 100 above, and with the driver or occupant 104 replying back with "Wow! No wonder I'm hungry." the trigger may be "hungry" and may be used to locate places to eat.

Instead of asking for the driver or occupant 104 to provide locations and/or restaurants, the voice assistant 102 may continue the conversation in an indirect manner leading to further clarification in which advertisements to provide. Continuing with FIG. 4 and shown at block 406, the voice assistant 102 may provide the generalized recommendation. For example, the statement "I have a recommendation for a good steak restaurant near here." was provided in the scenario 100 above.

At block 408, the voice assistant 102 may receive a response from the driver or occupant 104. The voice assistant 102 may receive this input through a microphone in the vehicle 202 or other device. The response may be a direct or may be indirect showing hesitancy whether they are interested in the generalized query from the voice assistant 102.

At decision block 410, a determination may be made on whether the driver or occupant 104 is interested or thinking about the advertisement with the advertisement being in the form of the generalized recommendation. When there is no interest, the processes may proceed to block 418 where the result data may be sent to the server 206. This may be verbalized by either the driver or occupant 104 or no answer may be given indicating little or no interest to the generalized query. The processes may end at block 420.

In the scenario 100 presented above, the voice assistant 102 may look or listen to keywords that may indicate an interest by the driver or occupant 104. That is, once the steak restaurant was recommended, in the generalized recommendation, and the driver or occupant 104 responds back with "hmmm", the voice assistant 102 may recognize that the driver or occupant 104 has as an interest in the advertisement.

At block 412, and if there is interest, the specific recommendation may be vocalized by the voice assistant 102. For example, and in accordance with the scenario 100 presented above, the voice assistant 102 may provide "The steak here is very tender and juicy!" The advertisement may be reproduced with sound, sights, videos and/or the like. Real-time or stored information from the restaurant may also be given.

At block 414, the voice assistant 102 may receive a response from the driver or occupant 104 to the specific recommendation. This may include "I'd love the steak right now! Let's go!" as provided in the previous scenario 100. Alternatively, the advertisement may not be wanted and ignored. The voice assistant 102 may learn and make future suggestions based on whether the driver or occupant 104 accepts the advertisement.

A next action according to the response provided by driver or occupant 104 may be taken at block 416. That is, if the driver or occupant 104 accepts the advertisement, the voice assistant 102 may provide instructions to the driver or occupant 104 to get to the advertiser's location. Furthermore coupons or other promotions may be given for accepting the advertisement. The server 206 may take into account the advertising fees and rewards that may be taken or given to and from the advertiser 204 or third party 208.

At block 418, the results of the acceptance or denial of the advertisements may be sent to the server 206. This may include whether the advertisement was effective in enticing the driver or occupant 104. This data may be used to prioritize information about advertisements for future advertisement deployments. Also, the results may be used to adjust the personal profile of the driver or occupant 104 to indicate which advertisements were effective. The processes may end at block 420.

Figure 5:
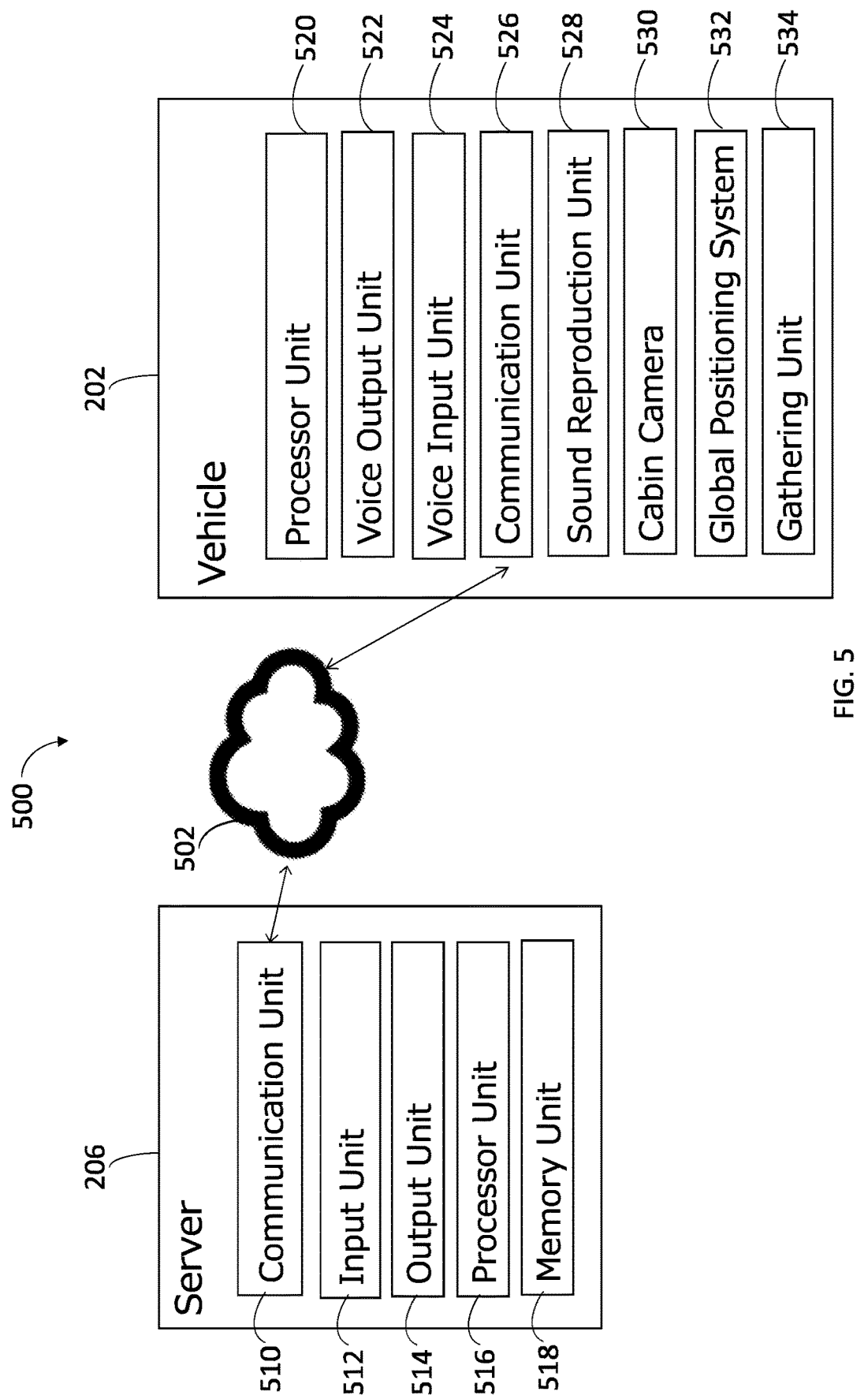
FIG. 5 is a schematic diagram of an illustrative scenario where the vehicle may incorporate voice assistant generated advertisements in accordance with one aspect of the present disclosure.

FIG. 5 is a schematic diagram of an illustrative scenario 500 where the vehicle 202 may incorporate voice assistant generated advertisements in accordance with one aspect of the present disclosure. The server 206 may communicate with the vehicle 202 through a network 502. The network 502 may include, for example, a local-area network (LAN), the Internet, intranet, wide-area network (WAN), personal-area network (PAN), campus-area network (CAN), metropolitan area network (MAN), global-area network (GAN), virtual private network, or any other type of network supporting communication between devices described herein. The network 502 may include both wired and wireless connections, including optical links. Data and other information may be distributed from the server 206 to and from the vehicle 202.

The server 206 may include, but is not limited to, a communication unit 510, input unit 512, output unit 514, processor unit 516, and memory unit 518 for handling advertisement requests and distribution. The communication unit 510 may include one or more units allowing radio communications between the server 206 and a wireless communication system, or allowing radio communication between the server 206 and a network 502 in which the server 206 is located. For example, the communication unit 510 may include at least one of a broadcast receiver, a mobile communication unit, a wireless Internet unit, a short-range communication unit, a location information unit or the like.

The input unit 512 of the server 206 may interact with the advertisers 204 and generate input data to control which advertisements may be provided to the vehicle 202. An operator at the server 206, or through their own terminal may determine which advertisements may be allowed. Other management functions may be established through this input unit 512. For example, what types of advertisements that the server 206 may be associated with. The input unit 512 may include, but is not limited to, a keypad, a dome switch, a touch pad (pressure/capacitance), a jog wheel, a jog switch or the like.

The output unit 514 of the server 206 may provide visual sense, auditory sense and/or tactile sense and may include a display, an audio output, an alarm, a haptic unit, or the like. Typical servers 206 may incorporate the input unit 512 into the output unit 514. That is, for example, a touch pad may both be an input unit 512 and an output unit 514.

The memory unit 518 may include an operating system and software instructions, ROM, RAM, and the processing unit 516, a network interface and data storage. The server 206 may process requests from the vehicle 202, advertisers 204, and/or third party 208. The server 206 may typically handle high volumes of transactions and large amount of queries for communication and data processing. RAM and ROM may be used to support the program codes that are operated by the processing unit 516. The memory unit 518 may be in a form of a hard disk, CD ROM, or equivalent storage medium. The processor unit 516 may support the authentications such as communications from external data servers, as well as allowing for anonymous transactions and general data encryption.

While the above embodiment describes a single computer system acting as the server 206, the functionality may be distributed over multiple computing systems. The databases may also be distributed over a cloud-computing environment known to those skilled in the relevant art. In one embodiment, the server 206 may be configured in a distributed architecture, wherein the databases and processors are housed in separate units or locations.

Turning to the vehicle 202, the vehicle 202 may include, but is not limited to, a processor unit 520, voice output unit 522, voice input unit 524, communication unit 526, sound reproduction unit 528, cabin camera 530, global positioning system 532, and/or gathering unit 534. These units may be operable with the voice assistant 102, where applicable. The voice assistant 102 may run wholly or partially on the vehicle 202, with other processes taking place on the server 206 or other location.

Computer programs on the vehicle 202, may be stored in a main and/or secondary memory, and executed by the processor unit 520 to perform the functions of the invention as described herein. RAM and ROM may be used to support the program codes that are operated by the processor. The memory may be in a form of a hard disk, CD ROM, or equivalent storage medium. The processor unit 520 may support the authentications such as communications from external data servers, as well as allowing for anonymous transactions and general data encryption.

The voice output unit 522 and voice input unit 524 may be part of the voice assistant 102. This may provide the conversational interface to interact with the driver or occupant 104. The voice output unit 522 and voice input unit 524 may be associated with a speaker and a microphone, respectively. These may be placed throughout the vehicle 202 or within a separate device such as a smartphone, that handles the voice output unit 522 and voice input unit 524.

The vehicle 202 may include a communication unit 526. Conventional Ethernet technology or internal or external modems may serve as the network interfaces for the communication unit 526 with the network 502. A transmission control unit (TCU) may be used as a network interface.

The sound reproduction unit 528 within the vehicle 202 may provide sounds, videos and/or images brought to the vehicle 202 by the advertiser 204. This may include real-time content being transmitted or streamed from the advertiser 204 to the vehicle 202 through the server 206 and the network 502. If the data and/or information is provided in real-time, cameras and/or microphones placed throughout the location of the advertiser 204 may be used.

The sound reproduction unit 528 may also provide stored sounds, videos and/or images from the server 206, which may not be in real-time. As shown, this information and/or data may be provided by the third party 208 that generated the advertisement or the advertisers 204 themselves.

The cabin camera 530 in the vehicle 202 may be used to determine a condition of the driver or occupant 104. This may be an optional feature. The condition of the driver or occupant 104 may be used by the voice assistant 102 to determine what their needs are in a roundabout or generalized way. In other words, the visual condition of the driver or occupant 104 may be used to determine what advertisement to serve. In one example, the driver or occupant 104 may be tired as detected by the cabin camera 530 and the vehicle assistant 102 may suggest a cup of coffee.

The vehicle 202 may also maintain the GPS 532. The GPS 532 may be used to provide location based advertisements as shown. The gathering unit 534 may be used to retrieve the information from the voice output unit 522 and voice input unit 524. The information may be used to determine a context of the conversation between the voice assistant 102 and the driver or occupant 104. The gathering unit 534 may identify a set of potential advertisements from this information. From the generalized query results and the interest of the driver or occupant 102 to the query, the set of potential advertisements may be narrowed down to the specific advertisement in the gathering unit 534.

While the gathering unit 534 is shown on the vehicle 202, the functions and/or features may be provided and processed on the server 206, or other platform. These functions and/or features may be wholly or partially processed on the server 206, vehicle 202, or other platform. For example, a distributed computing environment may be used to process the information.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A vehicle computing system comprising:
an input device;
an output device;

at least one processor; and a memory operatively coupled to the processor, the memory storing program instructions that when executed by the processor, causes the processor to:

provide and receive a conversation from the output device and input device;

identify potential advertisements based on the conversation;

provide a generalized recommendation related to the potential advertisements through the output device;

determine an interest to the generalized recommendation through the input device;

generate a specific recommendation associated with at least one advertisement within the potential advertisements if there is interest to the generalized recommendation through the output device;

connect with an advertiser of the at least one advertisement;

continuously capture real-time ambience information from a location of the advertiser of the at least one advertisement; and stream the real-time ambience information from the location of the advertiser of the at least one advertisement through the output device as the real-time ambience information is continuously captured, wherein the real-time ambience information includes sounds, images or videos continuously streamed from the location of the advertiser.

2. The vehicle computing system of claim 1, wherein providing and receiving the conversation from the output device and input device is facilitated by a voice assistant.

3. The vehicle computing system of claim 1, wherein identifying the potential advertisements based on the conversation comprises detecting at least one of a condition, location, time and weather.

4. The vehicle computing system of claim 3, wherein detecting the condition is performed through an in-vehicle camera.

5. The vehicle computing system of claim 1, wherein identifying the potential advertisements based on the conversation comprises categorizing the conversation and matching the categorizations with the potential advertisements.

6. The vehicle computing system of claim 1, wherein provide the generalized recommendation related to the potential advertisements through the output device comprises presenting the generalized recommendation as a broad category.

7. The vehicle computing system of claim 1, wherein determining the interest to the generalized recommendation through the input device comprises receiving a response from the input device.

8. A computer implemented method of providing advertisements to a vehicle comprising:

receiving a conversation within the vehicle;

identifying potential advertisements based on the conversation;

providing a generalized recommendation related to the potential advertisements to the vehicle;

selecting an advertisement within the potential advertisements if there is interest to the generalized recommendation;

generating a specific recommendation associated with the advertisement;

connecting with an advertiser of the at least one advertisement;

continuously capturing real-time ambience information from a location of the advertiser of the at least one advertisement; and streaming the real-time ambience information from the location of the advertiser as the real-time information is continuously captured, wherein the real-time ambience information includes sounds, images, or videos continuously streamed from the location of an advertiser of the advertisement.

9. The computer implemented method of providing advertisements of claim 8, wherein receiving the conversation from the vehicle comprises activating a voice assistant on the vehicle.

10. The computer implemented method of providing advertisements of claim 8, comprising receiving the potential advertisements from a plurality of advertisers located nearby the vehicle.

11. The computer implemented method of providing advertisements of claim 8, comprising receiving the potential advertisements from a third party service.

12. The computer implemented method of providing advertisements of claim 8, wherein selecting the advertisement within the potential advertisements if there is interest in the generalized recommendation comprises detecting at least one of a condition, location, time and weather.

13. A system comprising:

a vehicle having a voice assistant providing a conversation; and a server receiving the conversation and identifying potential advertisements based on the conversation, wherein the server selects an advertisement of an advertiser server from the potential advertisements, connects with an advertiser of the advertisement, continuously captures real-time ambience information from a location of the advertiser of the advertisement, and provides the advertisement along with the real-time ambience information from the location of the advertisement to the vehicle as the real-time ambience information is continuously captured, wherein the real-time ambience information includes sounds, images, or videos continuously streamed from the location of an advertiser of the advertisement.

14. The system of claim 13, wherein the server selects the advertisement of an advertiser server from the potential advertisements if there is an interest to a generalized recommendation provided within the vehicle.

* * * * *